United States Patent [19]

Crawford et al.

[11] Patent Number: 5,207,420
[45] Date of Patent: May 4, 1993

[54] ANIMAL PLAY BALL

[76] Inventors: Douglas M. Crawford; Barbara D. Crawford, both of 3187 Lucas Dr., Lafayette, Calif. 94549

[21] Appl. No.: 840,124

[22] Filed: Feb. 24, 1992

[51] Int. Cl.$^5$ .................. A63B 39/06; A01K 29/00
[52] U.S. Cl. .................. 273/58 K; 273/58 B; 119/29
[58] Field of Search ............. 273/58 R, 58 A, 58 D, 273/58 K, 60 A, 65 E, 65 EA, 65 EG, 58 B, 58 BA, 60 R, 60 B, 65 EC-65EF, DIG. 20; 119/29, 29.5

[56] References Cited

U.S. PATENT DOCUMENTS

| D. 138,150 | 6/1944 | Davidson | 273/58 R |
|---|---|---|---|
| 2,078,382 | 4/1937 | Hanshaw | 273/58 K |
| 2,086,094 | 7/1937 | Reach | 273/58 A |
| 2,521,703 | 9/1950 | Emmitt | 273/58 K |
| 2,783,046 | 2/1957 | Lien | 273/58 R |
| 4,131,273 | 12/1978 | Judkins | 273/58 K |
| 4,248,424 | 2/1981 | Judkins | 273/58 K |
| 4,887,814 | 12/1989 | Winter | 273/58 K |
| 4,919,083 | 4/1990 | Axelrod | 719/29.5 |
| 4,919,422 | 4/1990 | Ma | 273/58 K |
| 5,020,438 | 6/1991 | Brown | 273/58 K |

Primary Examiner—V. Millin
Assistant Examiner—Steven Wong
Attorney, Agent, or Firm—Thomas R. Lampe

[57] ABSTRACT

A play ball including a generally spherical body portion having an outer surface and a plurality of elongated, narrow ribs projecting outwardly from the outer surface. The ribs are interconnected and define a plurality of spaced recesses, all of the recesses being configured in the shape of an equilateral triangle and surrounded by three interconnected rib segments of the same length.

2 Claims, 2 Drawing Sheets

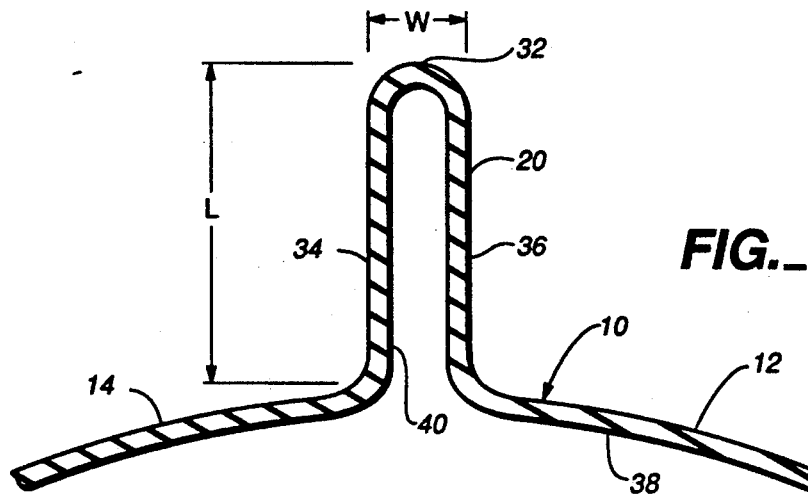
FIG._1A
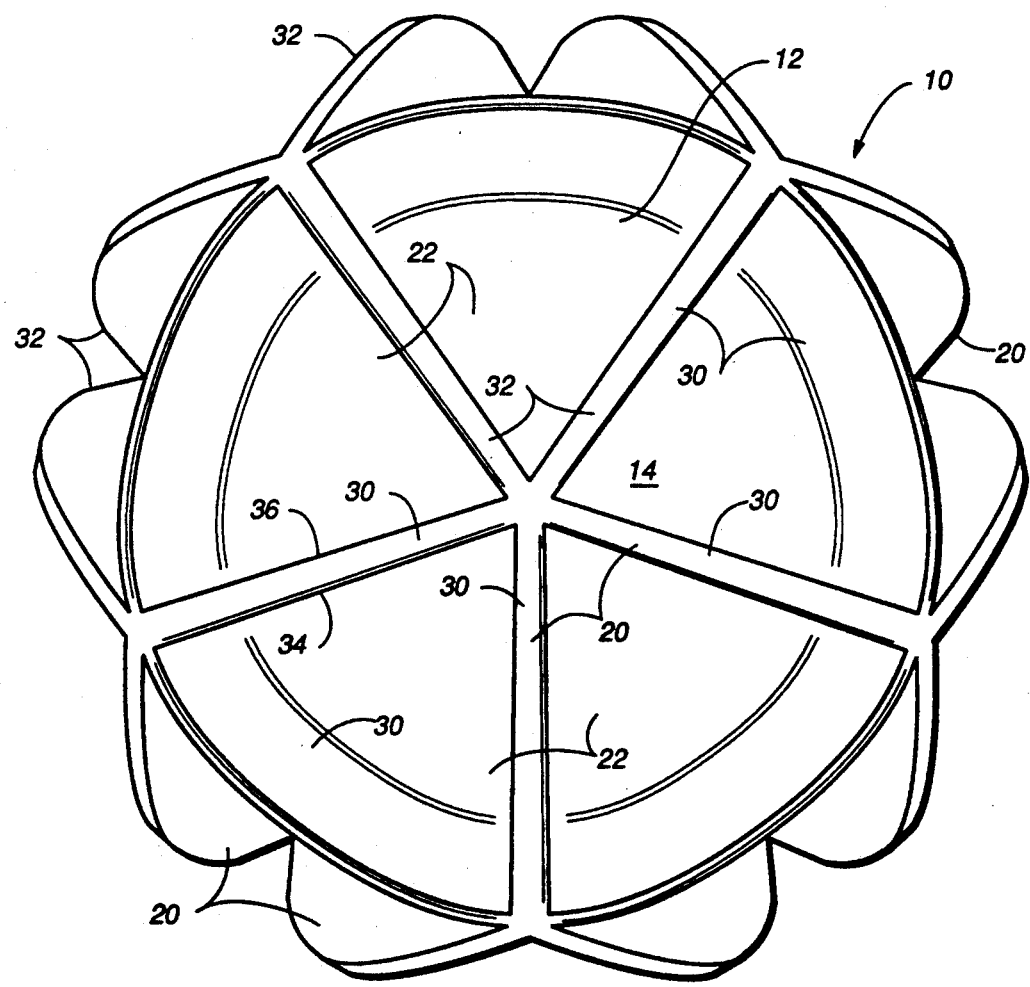
FIG._1

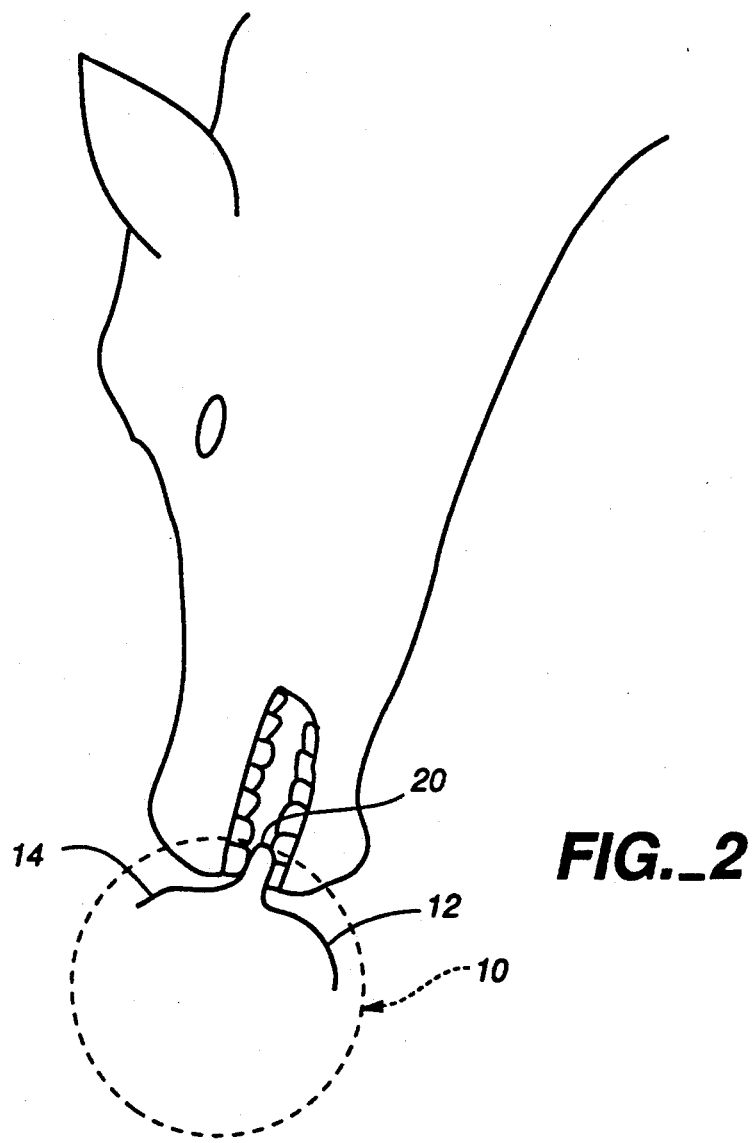
FIG._2

ANIMAL PLAY BALL

TECHNICAL FIELD

This invention relates to a play ball which is particularly adapted for use as an amusement and exercise device by animals, especially horses.

BACKGROUND ART

A great many ball constructions are known in the prior art. Examples are the ball constructions disclosed in U.S. Pat. No. 4,919,422, issued Apr. 24, 1990, U.S. Pat. No. 2,783,046, issued Feb. 26, 1957, U.S. Pat. No. 2,521,703, issued Sep. 12, 1950, U.S. Pat. No. 4,887,814, issued Dec. 19, 1989, U.S. Pat. No. 4,248,424, issued Feb. 3, 1981, U.S. Pat. No. 2,086,094, issued Jul. 6, 1937, U.S. Pat. No. 2,078,382, issued Apr. 27, 1937, and U.S. Pat. No. Des. 138,150, issued Jun. 27, 1944.

The ball which is the subject hereof is particularly adapted for use by animals, especially horses. Horses are often confined for extended periods of time and it has been found that the animals become bored and listless in the absence of external stimuli. The present apparatus is for the purpose of providing such stimuli. More particularly, the play ball disclosed herein affords amusement to the animal and provides exercise for the animal.

The play ball is specifically constructed to facilitate its use by an animal. For example, a horse, due to the particular configuration of the play ball, can bite and lift the ball as well as roll the ball on the ground. None of the balls disclosed in the aforesaid list of existing patents incorporate the particular structural elements of the present ball which facilitate such use.

DISCLOSURE OF INVENTION

The play ball of the present invention is of unitary construction and includes a generally spherical body portion having an outer surface and a plurality of elongated, narrow ribs affixed to and projecting outwardly from the outer surface.

The ribs are interconnected and define a plurality of spaced recesses. All of the recesses are configured in the shape of an equilateral triangle and are surrounded by three interconnected rib segments of the same length.

The ribs have outer arcuate surfaces disposed along an imaginary sphere spaced from the outer surface. The rib segments are of sufficient height and length to allow a horse to bite a selected rib segment and lift the play ball while the horse's muzzle is positioned in an adjacent recess.

The ribs are so configured as to allow rolling of the play ball on the rib outer arcuate surfaces when the play ball is on the ground.

Other features, advantages, and objects of the present invention will become apparent with reference to the following description and accompanying drawings.

BRIEF DESCRIPTION OF DRAWINGS

FIG. 1 is a side, elevation view of a play ball constructed in accordance with the teachings of the present invention;

FIG. 1A is an enlarged, cross-sectional view of a play ball rib and an immediately adjacent segment of the play ball body portion; and FIG. 2 is a somewhat schematic, pictorial presentation of a horse biting a ball rib and lifting the ball therewith.

BEST MODE FOR CARRYING OUT THE INVENTION

Referring now to the drawings, a play ball constructed in accordance with the teachings of the present invention is designated generally by reference numeral 10. The ball includes a generally spherical body portion 12 having an outer surface 14. The body portion 12, as is the rest of the play ball, is constructed of a relatively tough and durable material such as rubber or a suitable plastic material.

Narrow ribs 20 project outwardly from outer surface 14. The ribs are interconnected as shown and define a plurality of spaced recesses 22.

All of the recesses 22 are configured in the shape of an equilateral triangle, being surrounded by three interconnected web segments 30 of the same length.

The ribs 20 have outer arcuate surfaces 32 which are disposed along an imaginary sphere spaced from outer surface 14. Rib segments 30 are of sufficient height and length to allow a horse to bite a selected rib segment and lift the play ball while the horse's muzzle is in an adjacent recess 22. This action is shown in FIG. 2. The ribs 20 are so configured as to allow rolling of the play ball on the rib outer arcuate surfaces 3 when the play ball is on the ground.

The ribs 20 are of substantially uniform thickness and include side walls 34, 36 radiating outwardly from the outer surface 14 at substantially right angles thereto with the side walls of each rib 20 in substantially parallel relationship. As may be seen with reference to FIG. 1A, the body portion 12 defines a hollow interior 38 with the ribs 20 defining a channel 40 in communication with the hollow interior. Such a structure provides a resilience to both the body portion and the ribs which will render the ball more lively and provide the horse with more play action.

To facilitate use of the play ball 10 by a horse it is preferred that the dimensions of the various components of the ball fall within a certain range. More specifically, with particular reference to FIG. 1A it is preferred that the ribs 20 project outwardly from the outer surface 14 a distance L in the range of from about 1 inch to about 4 inches, and even more preferably about two inches. The preferred thickness W of the ribs is in the range of from about ⅛ inch to about 1 inch, and even more preferably about ⅜ inch. The length of the rib segments 30 is preferably in the range of from about 4 inches to about 12 inches.

We claim:

1. A play ball of unitary construction for use by a horse, said play ball including a generally spherical body portion having an outer surface and a plurality of elongated, narrow ribs affixed to and projecting outwardly from said outer surface a distance in the order of from about 1 inch to about 4 inches, said elongated, narrow ribs being of substantially uniform thickness in the range of from about ⅛ inch to about 1 inch and including side walls radiating outwardly from said outer surface at substantially right angles thereto with the side walls of each rib in substantially parallel relationship, with said elongated, narrow ribs being interconnected and defining a plurality of spaced recesses, all of said recesses configured in the shape of an equilateral triangle and surrounded by three interconnected rib segments of the same length and the rib segment length being in the range of from about 4 inches to about 12 inches, said ribs having outer arcuate surfaces disposed along an imaginary sphere spaced from said outer surface, each of said rib segments for selective biting by a horse whereby said horse may lift and carry said play ball while the horse's muzzle is in an adjacent recess, and said elongated, narrow ribs being so configured as to allow rolling of said play ball on said rib outer arcuate surfaces when the play ball is on the ground.

2. The play ball according to claim 1 wherein said body portion has a hollow interior and wherein each of said ribs defines a channel in communication with said hollow interior.

* * * * *